(12) United States Patent
Hiramatsu et al.

(10) Patent No.: US 7,693,278 B2
(45) Date of Patent: Apr. 6, 2010

(54) DATA DISTRIBUTION APPARATUS AND DATA COMMUNICATIONS SYSTEM

(75) Inventors: Takahiro Hiramatsu, Tokyo (JP); Hironobu Abe, Tokyo (JP); Koichi Yamada, Tokyo (JP); Junichi Yokosato, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1152 days.

(21) Appl. No.: 11/297,360

(22) Filed: Dec. 9, 2005

(65) Prior Publication Data

US 2007/0033391 A1 Feb. 8, 2007

(30) Foreign Application Priority Data

Aug. 2, 2005 (JP) .............................. 2005-224434

(51) Int. Cl.
*H04L 29/06* (2006.01)
*G06F 11/30* (2006.01)
*H04N 7/167* (2006.01)
*H04K 1/04* (2006.01)

(52) U.S. Cl. .................. 380/37; 380/216; 380/268; 713/160; 713/189

(58) Field of Classification Search .............. 713/160, 713/189; 380/37, 216, 268
See application file for complete search history.

(56) References Cited

U.S. PATENT DOCUMENTS 7,406,595 B1 * 7/2008 Boyle et al. ............... 713/160

2003/0039355 A1 * 2/2003 McCanny et al. ............ 380/37
2003/0108196 A1 * 6/2003 Kirichenko .................. 380/37
2004/0161105 A1 * 8/2004 Park et al. ................... 380/28
2005/0002525 A1   1/2005 Alkove et al.
2006/0039556 A1 * 2/2006 Suen et al. ................... 380/44

OTHER PUBLICATIONS

Schulzrinne et al., Audio-Video Transport Working Group, Standards Track, Jan. 1996, pp. 1-75.
Baugher et al., Network Working Group, Standards Track, Mar. 2004 pp. 1-56.

* cited by examiner

*Primary Examiner*—Nasser Moazzami
*Assistant Examiner*—Mohammad W Reza
(74) *Attorney, Agent, or Firm*—Birch, Stewart, Kolasch & Birch, LLP

(57) ABSTRACT

An RTP packet generating unit 11 packetizes data into packets, and adds identification information to the header of each of the packets, the identification information identifying each of the packets. An RTP packet encrypting unit 13 divides data included in each of the generated packets into blocks, and encrypts the data included in each of the packets on a block-by-block basis using an encryption key which an encryption key sharing unit 12 shares with a receiving client in such a manner that, when encrypting a first block of the data, the packet encrypting unit encrypts it using the identification information for identifying each of the packets, which is contained, as an initial vector, in the header of each of the packets, and, when encrypting each subsequent block of the data, encrypts it according to an encryption method which uses an immediately-previously-encrypted block.

12 Claims, 3 Drawing Sheets

DATA DISTRIBUTION APPARATUS AND DATA COMMUNICATIONS SYSTEM

BACKGROUND OF THE INVENTION

1. Field of the Invention

The present invention relates to a data distribution apparatus that distributes data, such as video data or audio data, and a data communications system provided with the data distribution apparatus and a data receiving apparatus that receives data distributed thereto from the data distribution apparatus.

2. Description of Related Art

Nonpatent reference 1 discloses, as related art, a system that distributes real-time data represented by video data or audio data onto an IP (Internet Protocol) network. Although a distribution-side apparatus packetizes such data into packets and then transmits them onto the IP network, it is not guaranteed that the packets are certainly distributed to destinations and that the receiving apparatus can receive the packets sequentially in the sequence in which they are distributed from the distribution-side apparatus.

The TCP (Transport Control Protocol) protocol is usually used when such a guarantee is required. However, when the TCP protocol is used, since packet losses are recovered by resending, the TCP protocol is not suitable for applications which require real-time nature. Although the UDP (User Datagram Protocol) is used for applications which require real-time nature, the UDP guarantees neither reliable distribution of packets, nor distribution of packets in orderly sequence, like the IP.

In the case of transmission of real-time data such as video data or audio data, since real-time nature is thought as important and the expenditure of time to resend packets is not allowed, resending of packets is not carried out even if packet losses occur. However, when using transmitted packets, receive-side apparatus need to rearrange them in the sequence in which the packets are distributed by the distributing-side apparatus.

Although packet losses are disregarded in the RTP (Real-time Transport Protocol) disclosed by nonpatent reference 1, each of packets to be distributed contains a 16-bit sequence number showing the how-manieth packet it is in the header thereof to enable the receive-side apparatus to easily rearrange the packets in the sequence in which they are distributed. Each of the packets further contains a time stamp showing time information in the header thereof to make it possible for the distribution-side apparatus and the receive-side apparatus to establish time synchronization between them.

Nonpatent reference 2 discloses, as related art, a means for encrypting the payload of an RTP packet except the header of the RTP packet. This means generates an encryption key stream in the counter mode of AES (Advanced Encryption Standard) using an encryption key and information including a sequence number contained in the RTP header, and encrypts the payload by implementing the logical exclusive OR operation on the encryption key stream and the payload.

[Nonpatent reference 1] IETF Standard RFC 1889 RTP: A Transport Protocol for Real-Time Applications January 1996

[Nonpatent reference 2] IETF Standard RFC 3711 The Secure Real-time Transport Protocol (SRTP) March 2004

Although block cipher is used for the encryption of an RTP packet disclosed by above-mentioned nonpatent reference 2, it is actually used as stream cipher which generates the encryption key stream. The stream cipher has a problem of low levels of security. For example, when an identical encryption key stream is used for the encryption of RTP packets, the encrypted RTP packets can be easily cracked.

A further problem is that since the counter mode is a comparatively new encryption mode, existing encryption hardware may not support the counter mode and general-purpose encryption hardware cannot be used for the counter-mode encryption of RTP packets.

SUMMARY OF THE INVENTION

The present invention is made in order to solve the above-mentioned problems, and it is therefore an object of the present invention to provide a data distribution apparatus that can carry out data communications via a communication path which does not guarantee that data is transmitted certainly with a high level of security using general-purpose encryption hardware, and a data communications system provided with the data distribution apparatus.

In accordance with the present invention, there is provided a data distribution apparatus including: a packet generating unit for packetizing data into a plurality of packets, and for adding identification information to a header of each of the plurality of packets, the identification information identifying each of the plurality of packets; an encryption key sharing unit for sharing an encryption key with a data receiver; a packet encrypting unit for dividing data included in each of the plurality of packets generated by the packet generating unit into blocks, and for encrypting the data included in each of the plurality of packets on a block-by-block basis using the encryption key which the encryption key sharing unit shares with the data receiver in such a manner that, when encrypting a first block of the data, the packet encrypting unit encrypts it using the identification information for identifying each of the packets, which is contained, as an initial vector, in the header of each of the plurality of packets, and, when encrypting each subsequent block of the data, encrypts it according to an encryption method which uses an immediately-previously-encrypted block; and a packet communications unit for distributing each of the plurality of packets encrypted by the packet encrypting unit to the data receiver via a communications path.

Therefore, the present invention offers an advantage of being able to carry out data communications with a high level of security using general-purpose encryption hardware.

Further objects and advantages of the present invention will be apparent from the following description of the preferred embodiments of the invention as illustrated in the accompanying drawings.

DETAILED DESCRIPTION OF THE PREFERRED EMBODIMENTS

Embodiment 1

Figure 1:
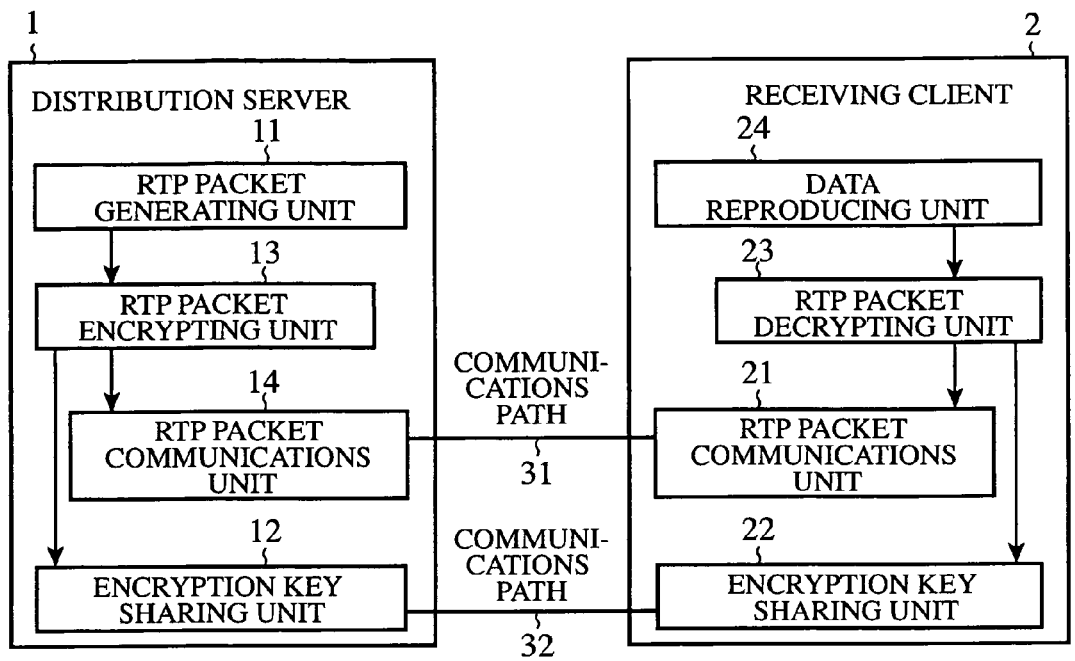
FIG. 1 is a block diagram showing the structure of a data communications system in accordance with embodiment 1 of the present invention.

FIG. 1 is a block diagram showing the structure of a data communications system in accordance with embodiment 1 of the present invention. This data communications system is provided with a distribution server (i.e., a data distribution apparatus) 1 which distributing data, such as video data or audio data, according to the RTP, and a receiving client (i.e., a data receiver) 2 which receives the data, such as video data or audio data, distributed thereto from the distribution server 1.

As shown in FIG. 1, the distribution server 1 includes an RTP packet generating unit (i.e., a packet generating means) 11 and an encryption key sharing unit (i.e., an encryption key sharing means or a first encryption key sharing means) 12, an RTP packet encrypting unit (i.e., a packet encrypting means) 13, and an RTP packet communications unit (i.e., a packet communications means or a first packet communications means) 14. The receiving client 2 is provided with an RTP packet communications unit (i.e., a second packet communications means) 21, an encryption key sharing unit (i.e., a second encryption key sharing means) 22, an RTP packet decrypting unit (i.e., a packet decrypting means) 23, and a data reproducing unit (i.e., a data reproducing means) 24. The RTP packet communications unit 14 of the distribution server 1 is connected to the RTP packet communications unit 21 of the receiving client 2 by way of a communication path 31, and the encryption key sharing unit 12 of the distribution server 1 is connected to the encryption key sharing unit 22 of the receiving client 2 by way of a communication path 32.

In the distribution server 1 of FIG. 1, the RTP packet generating unit 11 packetizes data not shown, such as video data or audio data, into RTP packets, and adds a sequence number which is information for identifying each of the generated RTP packets, a time stamp showing time information, etc. to the header of each of the RTP packets. The encryption key sharing unit 12 shares the encryption key with the receiving client 2.

The RTP packet encrypting unit 13 divides data included in each of the RTP packets generated by the RTP packet generating unit 11 into blocks, and encrypts the data included in each of the RTP packets on a block-by-block basis using the encryption key which the encryption key sharing unit 12 shares with the receiving client in such a manner that, when encrypting a first block of the data, the packet encrypting unit encrypts it using the sequence number which is the identification information for identifying each of the packets, which is contained, as an initial vector, in the header of each of the RTP packets, and, when encrypting each subsequent block of the data, encrypts it according to an encryption method which uses an immediately-previously-encrypted block. The RTP packet communications unit 14 distributes each of the RTP packets encrypted by the RTP packet encrypting unit 13 to the receiving client 2 via the communication path 31.

In the receiving client 2 of FIG. 1, the RTP packet communications unit 21 receives each of the encrypted RTP packets which are distributed from the distribution server 1 via the communication path 31. The encryption key sharing unit 22 of the receiving client shares the encryption key with the distribution server 1. The RTP packet decrypting unit 23 decrypts each of the RTP packets received by the RTP packet communications unit 21 using the encryption key which the encryption key sharing unit 22 shares with the distribution server. The data reproducing unit 24 reproduces the original data, such as the original video data or audio data, from the RTP packets decrypted by the RTP packet decrypting unit 23.

The communication path 31 can be an IP network, such as the Internet, via which the RTP packets are transmitted from the distribution server to the receiving client. The communication path 32 is a communication path via which the encryption key information is transmitted, and can be the same as the communication path 31 or a similar, different communication path. As an alternative, the communication path 32 can be a completely different communication path.

Next, the operation of the data communications system in accordance with this embodiment of the present invention will be explained. The distribution server 1 and receiving client 2 can share the encryption key (not shown) secretly, without the encryption key being known by any third parties other than the distribution server 1 and receiving client 2 because the encryption key sharing unit 12 of the distribution server 1 carries out communications with the encryption key sharing unit 22 of the receiving client 2 via the communication path 32 before starting data communications according to the RTP protocol. Although a means for sharing the encryption key is not specified here, SSL (Secure Socket Layer), MIKEY (Multimedia Internet KEYing), or another method can be used, for example. The generation of the encryption key can be carried out by either the distribution server 1 or the receiving client 2.

In the distribution server 1, the RTP packet generating unit 11 divides the not-shown data to be distributed, such as video data or audio data, into RTP packets so that each of the RTP packets has a fixed or variable-length packet size. The size of each of the RTP packets can be determined according to the characteristics of the data to be distributed, the characteristics of the communication path 31, or another factor. For example, when the data to be distributed are video data, video data about one frame can be stored in each of the RTP packets. When an IP network is used as the communication path 31, the distribution server 1 can packetize the data into IP packets so that each of the IP packets has a 1500-byte size which is standard in communications via normal IP networks, or another size.

Each of the RTP packets consists of an RTP header and an RTP payload, and the RTP packet generating unit 11 stores a plurality of data pieces into which the data to be distributed is divided according to the above-mentioned procedure into a plurality of RTP payloads, respectively, and adds an RTP header including a 16-bit sequence number and so on to the head of each of the plurality of RTP payloads.

The RTP packet encrypting unit 13 divides the RTP payload of each of the plurality of RTP packets generated by the RTP packet generating unit 11 into blocks, and encrypts the RTP payload on a block-by-block basis using the encryption key which the encryption key sharing unit 12 shares with the receiving client 2 according to an encryption method which is classified into block cipher and which is included in public encryption key encrypting methods, such as DES (Data Encryption Standard) and AES (Advanced Encryption Standard). In order to provide a high level of security, the RTP packet encrypting unit 13 uses, for example, a CBC (Cipher Block Chaining) mode encryption method which reflects a result of the encryption of a previously-encrypted block to the encryption of the following block, as encryption mode of the block cipher.

In order to carry out communications of data encrypted in the CBC mode and to make the receiving client 2 to decrypt the data normally, all blocks into which the data is divided need to be transmitted to the receiving client without having any error. When the communication path 31 is an IP network via which data is transmitted in units of packets, a data loss occurs on a packet-by-packet basis. Therefore, if a packet is lost, in order to prevent the receiving client from being unable to decrypt following packets, the result of the encryption of the last block of the preceding packet cannot be used as the initial vector for encryption.

In contrast, in accordance with this embodiment 1, the RTP packet encrypting unit 13 uses, as the initial vector, the sequence number which is padded so as to have the same length as the initial vector. Since the sequence number contained in the RTP header of each of the RTP packets varies from packet to packet, and is contained in the RTP header which is not encrypted, the sequence number is certainly shared between the receive-side apparatus the distribution-side apparatus. The RTP packet communications unit 14 distributes each of the plurality of RTP packets encrypted by the RTP packet encrypting unit 13 to the RTP packet communications unit 21 of the receiving client 2 via the communication path 31.

In the receiving client 2, the RTP packet communications unit 21 outputs each of the plurality of encrypted RTP packets which it has received from the distribution server to the RTP packet decrypting unit 23. The RTP packet decrypting unit 23 receives the encryption key which the encryption key sharing unit 22 shares with the distribution server 1 from the encryption key sharing unit 22, and decrypts the RTP payload of each of the plurality of encrypted RTP packets using both the encryption key and the sequence number contained in the RTP header of each of the encrypted RTP packets. Each decrypted RTP packet is outputted to the data reproducing unit 24. The data reproducing unit 24 reproduces original data from each RTP packet decrypted by the RTP packet decrypting unit 23, and outputs it to not-shown processing units which need the data. When the distributed data are image data, for example, the not-shown processing units are a video decoding unit and a video display, whereas when the distributed data are audio data, the not-shown processing units are an audio decoding unit, an audio reproducing unit, etc.

In accordance with this embodiment 1, the RTP packet generating unit (i.e., a packet generating means) 11 generates RTP packets, and the RTP packet encrypting unit (i.e., a packet encrypting means) 13 encrypts each of the RTP packets using, as the initial vector, the sequence number contained in the RTP header of each of the RTP packets. As an alternative, the packet generating means can generate IP packets and the packet encrypting means can encrypt each of the IP packets using, as the initial vector, an ID (identifier) contained in the IP header of each of the IP packets, or the packet generating means can generate UDP packets and the packet encrypting means can encrypt each of the UDP packets using, as the initial vector, an ID (identifier) contained in the UDP header of each of the UDP packets.

As mentioned above, in accordance with embodiment 1 of the present invention, the RTP packet encrypting unit 13 divides data included in each of a plurality of RTP packets generated by the RTP packet generating unit 11 into blocks, and encrypts the data included in each of the plurality of RTP packets on a block-by-block basis using the encryption key which the encryption key sharing unit 12 shares with the receiving client in such a manner that, when encrypting a first block of the data, the packet encrypting unit encrypts it using the sequence number which is identification information for identifying each of the packets, which is contained, as the initial vector, in the RTP header of each of the plurality of packets, and, when encrypting each subsequent block of the data, encrypts it according to a CBC mode encryption method which uses an immediately-previously-encrypted block. Therefore, the present embodiment offers an advantage of being able to carry out data communications with a high level of security using general-purpose encryption hardware in the communication path 31, such as an IP network, which does not guarantee that data is transmitted certainly.

Embodiment 2

A data communications system in accordance with embodiment 2 of the present invention has the same structure as that according to above-mentioned embodiment 1 shown in FIG. 1. The data communications system according to above-mentioned embodiment 1 uses, as an initial vector, a sequence number contained in the RTP header of each of packets into which data to be distributed is divided. In contrast, the data communications system in accordance with embodiment 2 of the present invention uses, as the initial vector, an encrypted sequence number.

Figure 2:
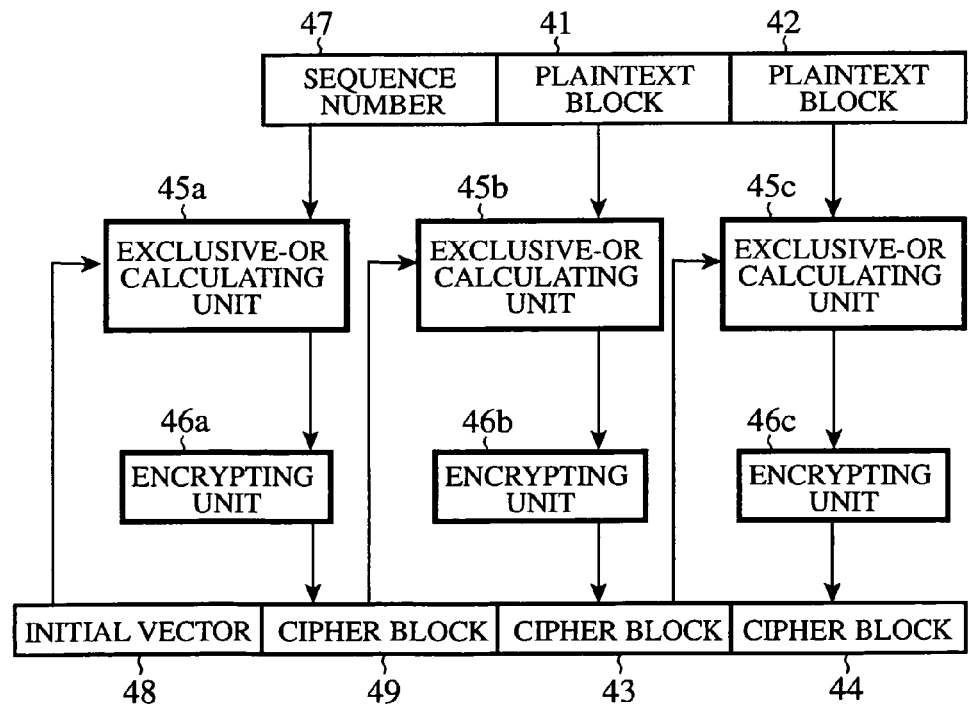
FIG. 2 is a diagram for explaining the operation of an RTP packet encrypting unit in CBC mode of a distribution server in the data communications system in accordance with embodiment 2 of the present invention.

FIG. 2 is a diagram for explaining the operation of an RTP packet encrypting unit in CBC mode of a distribution server in the data communications system in accordance with embodiment 2 of the present invention. In FIG. 2, a plaintext block 41 is the first one of plaintext blocks in units of a block size into which the RTP payload of each packet to be distributed is divided, and a plaintext block 42 is the second one of plaintext blocks in units of the block size into which the RTP payload of each packet to be distributed is divided. A cipher block 43 is the encrypted plaintext block 41, and a cipher block 44 is the encrypted plaintext block 42. Each of exclusive-OR calculating units 45a, 45b, and 45c implements the logical exclusive OR operation on two inputs applied thereto. Although the three exclusive-OR calculating units are illustrated in the figure for the sake of simplicity, they can be constructed of a piece of hardware. Each of encrypting units 46a, 46b, and 46c encrypts data input thereto using an encryption key which an encryption key sharing unit 12 shares with the receiving client. Although the three encrypting units are illustrated in the figure for the sake of simplicity, they can be constructed of a piece of hardware.

In FIG. 2, a sequence number 47 is obtained by padding the sequence number contained in the RTP header so that the sequence number has the same size as the plaintext block 41 or 42. An initial vector 48 has a predetermined value and is shared between the distribution server 1 and the receiving client 2. A cipher block 49 is obtained by encrypting the result of the logical exclusive-OR operation on the sequence number 47 and the initial vector 48, and corresponds to the initial vector which is used by the data communications system according to above-mentioned embodiment 1. That is, in accordance with this embodiment 2, the encrypted sequence number 47 is used as the initial vector.

Next, the operation of the data communications system in accordance with this embodiment of the present invention will be explained. First, the exclusive-OR calculating unit 45a implements the logical exclusive OR operation on the sequence number 47 and the initial vector 48 having the predetermined value, and outputs the logical exclusive OR operation result to the encrypting unit 46a. The encrypting unit 46a encrypts the logical exclusive OR operation result using the encryption key which the encryption key sharing unit 12 shares with the receiving client to generate and output the cipher block 49.

After that, the exclusive-OR calculating unit 45b carries out the logical exclusive OR operation in the same way that it does in normal CBC mode in which the cipher block 49 is assumed to be the initial vector. The exclusive-OR calculating unit 45b implements the logical exclusive OR operation on the plaintext block 41 and the cipher block 49, and outputs the logical exclusive OR operation result to the encrypting unit 46b. The encrypting unit 46b encrypts the logical exclusive OR operation result using the encryption key which the encryption key sharing unit 12 shares with the receiving client to generate and output the cipher block 43. The exclusive-OR calculating unit 45c then implements the logical exclusive OR operation on the plaintext block 42 and the cipher block 43, and outputs the logical exclusive OR operation result to the encrypting unit 46c. The encrypting unit 46c encrypts the logical exclusive OR operation result using the encryption key which the encryption key sharing unit 12 shares with the receiving client to generate and output the cipher block 44.

When the RTP packet encrypting unit 13 thus performs this processing on all plaintext blocks including the not-shown last plaintext block, into which the RTP payload of each packet is divided, successively, all cipher blocks from the cipher block 49 to the not-shown last cipher block are outputted. The RTP packet encrypting unit 13 combines all the cipher blocks except the cipher block 49, and stores them in the RTP payload.

An RTP packet decrypting unit 23 of the receiving client 2 obtains plaintext data which is the combination of all the plaintext blocks from the plaintext block 41 to the not-shown last plaintext inclusive by carrying out processing which is the reverse of that carried out by the RTP packet encrypting unit 13 of the distribution server 1.

As the initial vector 48 having the predetermined value, either zero or a fixed value other than zero is used without exception. As an alternative, a value which is secretly predetermined on a random basis, like the encryption key, can be shared between the distribution server 1 and the receiving client 2.

When using either zero or another fixed value as the initial vector 48, the data communications system in accordance with this embodiment 2 can make only the encryption key be shared secretly between the distribution server 1 and the receiving client 2, and can further improve the security compared with that according to above-mentioned embodiment 1. When making a random value be shared secretly between the distribution server 1 and the receiving client 2 as the initial vector 48, the data communications system can further improve the security. In either case, as can be seen from FIG. 2, since the data communications system in accordance with this embodiment 2 carries out the same processing as that in normal CBC mode even if it performs the additional processing mentioned above, it can use the encryption hardware for performing encryption processing in general-purpose CBC mode.

As mentioned above, this embodiment 2 offers the same advantage as provided by above-mentioned embodiment 1, and further offers another advantage of being able to further improve the security because the RTP packet encrypting unit 13 encrypts each packet using, as the initial vector, the encrypted sequence number.

Embodiment 3

A data communications system in accordance with embodiment 3 of the present invention has the same structure as that according to above-mentioned embodiment 1 shown in FIG. 1. In the data communications system according to this embodiment 3, an RTP packet encrypting unit 13 of a distribution server encrypts each packet using, as an initial vector, an extended sequence number.

Figure 3:
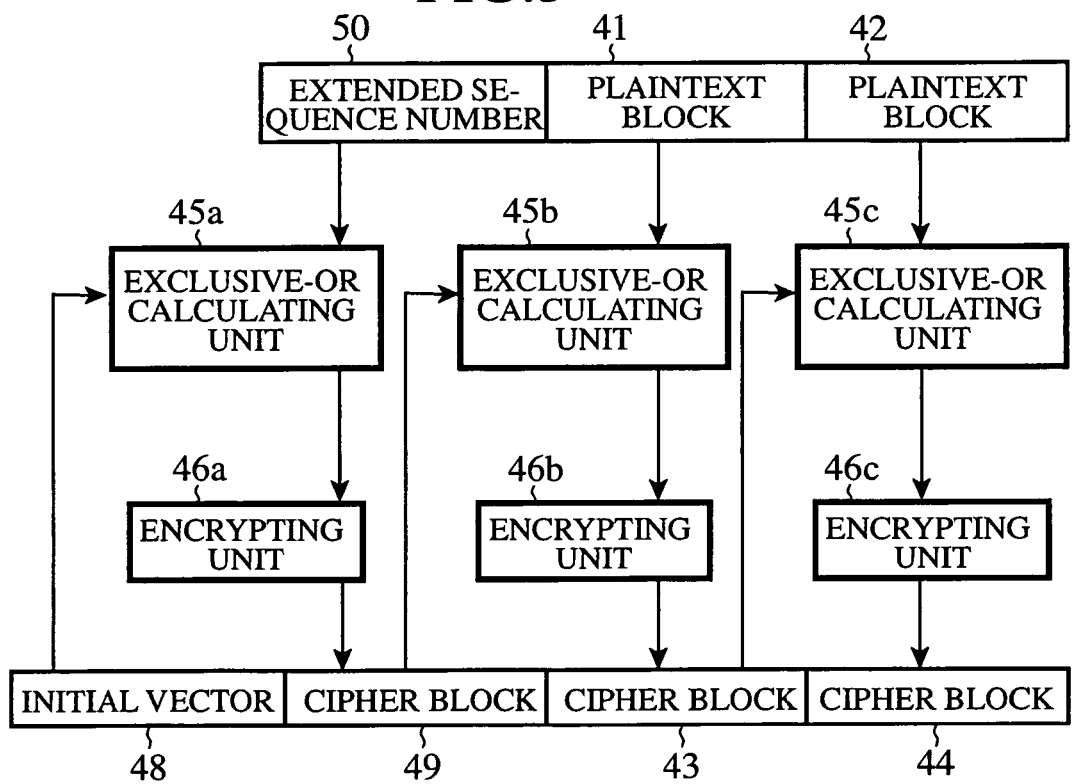
FIG. 3 is a diagram for explaining the operation of an RTP packet encrypting unit in CBC mode of a distribution server in a data communications system in accordance with embodiment 3 of the present invention.

FIG. 3 is a diagram for explaining the operation of the RTP packet encrypting unit in CBC mode of the distribution server in the data communications system in accordance with embodiment 3 of the present invention. In FIG. 3, the extended sequence number 50 is obtained by extending a 16-bit sequence number contained in the RTP header of each packet to be distributed so that it has an arbitrary length, and other reference numerals 41 to 49 denote the same components or data as shown in FIG. 2.

The sequence number contained in the RTP header is a 16-bit value. Therefore, after a packet having a sequence number 65535 is distributed, the sequence number is cycled to zero. The number of times that the sequence number is cycled is counted by a counter with an arbitrary number of bits, and a combination of this counter's value and the sequence number is used as the extended sequence number 50. By setting the number of bits of this counter appropriately, the possibility that an identical initial vector is used for encryption of two or more RTP packets becomes negligible.

Next, the operation of the data communications system in accordance with this embodiment of the present invention will be explained. An exclusive-OR calculating unit 45a implements the logical exclusive OR operation on the extended sequence number 50 and the initial vector 48 having the predetermined value, and outputs the logical exclusive OR operation result to an encrypting unit 46a. The encrypting unit 46a encrypts the logical exclusive OR operation result using an encryption key which an encryption key sharing unit 12 shares with the receiving client to generate and output a cipher block 49. After that, the exclusive-OR calculating unit 46a carries out the logical exclusive OR operation in the same way that it does in normal CBC mode, like that of above-mentioned embodiment 2.

The counter's value needs to be shared between the distribution server 1 and the receiving client 2. To this end, the counter's value is distributed to the receiving client 2 while being stored in the extended header of each RTP packet. As an alternative, such a counter can be independently disposed in each of the distribution server 1 and the receiving client 2 so as to independently count the number of times that the sequence number is cycled.

In order to explain an advantage provided by this embodiment 3 of the present invention, a case where a not-shown third party that can replace the data to be distributed with other data exists on a communication path 31.

In the data communications system according to any of above-mentioned embodiments 1 and 2, when a not-shown third party replaces the data distributed by the distribution server 1 with other data, the receiving client 2 may be unable to recognize that the data distributed from the distribution server 1 has been replaced by other data. That is, the third party can record all RTP packets which it receives until the 16-bit sequence number is cycled for the first time around, and can replace each series of subsequent RTP packets in which the sequence number is cycled for a second or later time with the recorded series of RTP packets and distribute them to the receiving client. Since the RTP packet decrypting unit 23 of the receiving client 2 can decrypt each received RTP packet normally as long as the sequence number 47, initial vector 48, and not-shown encryption key which are transmitted from the distribution server match with those included in the other data by which the original data is replaced by the not-shown third party, respectively, the receiving client 2 cannot detect that the data distributed from the distribution server has been replaced by other data. In contrast, the data communications system in accordance with this embodiment 3 can prevent the sequence number from cycling using the extended sequence number, thereby defending the data communications system itself against such an attack as mentioned above.

As mentioned above, this embodiment 3 offers the same advantage as provided by above-mentioned embodiment 2, and offers another advantage of being able to further improve the security as compared with above-mentioned embodiment 2 because any third party can hardly guess the value of the cipher block 49 and therefore such an attack as mentioned above can be prevented.

In accordance with this embodiment 3, although the extended sequence number 50 is encrypted, it is not necessary to encrypt the extended sequence number 50, just as in the case of above-mentioned embodiment 1.

Embodiment 4

A data communications system in accordance with embodiment 2 of the present invention has the same structure as that according to above-mentioned embodiment 1 shown in FIG. 1. The operation of an RTP packet encrypting unit in CBC mode of a distribution server in the data communications system in accordance with embodiment 4 is shown in FIG. 3 of above-mentioned embodiment 3. The data communications system in accordance with this embodiment 4 uses a value set on a random basis as an initial value of the above-mentioned counter used for the determination of the extended sequence number as mentioned in embodiment 3, and a distribution server 1 and a receiving client 2 share the value secretly and count the number of times that the sequence number is cycled independently.

As mentioned above, this embodiment 4 offers the same advantage as provided by above-mentioned embodiment 3, and offers another advantage of being able to prevent an attack, as described in above-mentioned embodiment 3, by a third party which intervenes on the communication path by keeping a part of the extended sequence number secret even when an identical key is used for distribution of two or more data.

Embodiment 5

A data communications system in accordance with embodiment 5 of the present invention has the same structure as that according to above-mentioned embodiment 1 shown in FIG. 1. In addition to the sequence number 47 or extended sequence number 50 which is used in any of above-mentioned embodiments 1 to 4, the data communications system in accordance with this embodiment 5 uses a time stamp included in the RTP header of each packet and showing time information.

Figure 4:
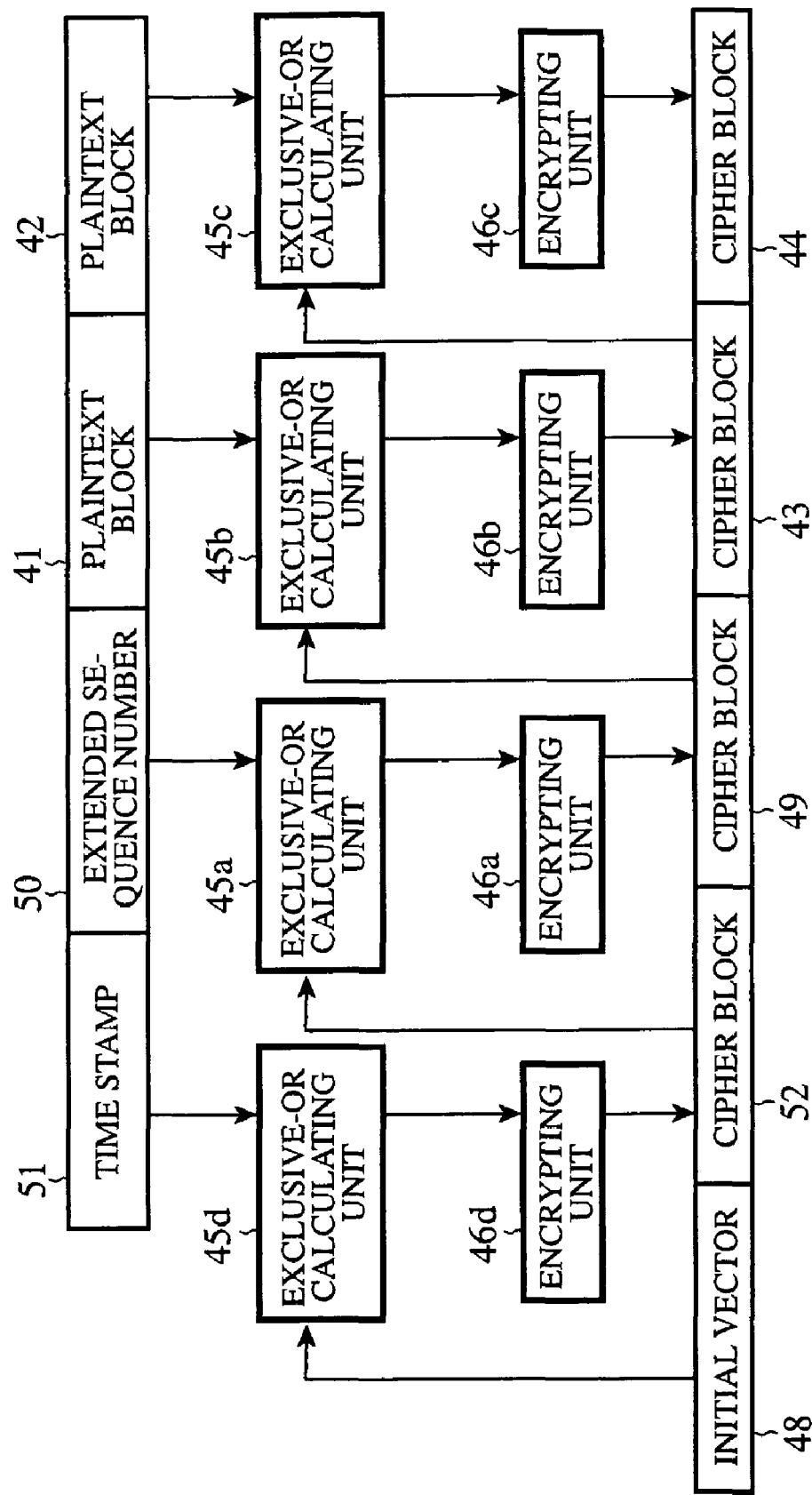
FIG. 4 is a diagram for explaining the operation of an RTP packet encrypting unit in CBC mode of a distribution server in a data communications system in accordance with embodiment 4 of the present invention.

FIG. 4 is a diagram for explaining the operation of an RTP packet encrypting unit in CBC mode of a distribution server in the data communications system in accordance with embodiment 5 of the present invention. In FIG. 4, an exclusive-OR calculating unit 45d implements the logical exclusive OR operation on two inputs applied thereto, and an encrypting unit 46d encrypts data input thereto using a not-shown encryption key. The time stamp 51 indicates time information and is contained in the RTP header of each packet, and a cipher block 52 is obtained by encrypting the result of the logical exclusive OR operation on the time stamp 51 and an initial vector 48 having a predetermined value. Other reference numerals 41 to 50 denote the same components or data as shown in FIG. 3.

Next, the operation of the data communications system in accordance with this embodiment of the present invention will be explained. The exclusive-OR calculating unit 45d implements the logical exclusive OR operation on the time stamp 51 and the predetermined initial vector 48, and outputs the logical exclusive OR operation result to the encrypting unit 46d. The encrypting unit 46d encrypts the logical exclusive OR operation result using the encryption key which an encryption key sharing unit 12 shares with a receiving client, and outputs a cipher block 52. After that, the distribution server operates in the same way that that in accordance with embodiment 3 shown in FIG. 3 does.

As mentioned above, this embodiment 5 offers the same advantage as provided by above-mentioned embodiment 3, and offers another advantage of being able to further improve the security by using the time stamp 51 showing time information as a value which is used for the encryption of each packet. This embodiment offers a still further advantage of being able to use hardware which encrypts each packet in general-purpose CBC mode.

The distribution server in accordance with this embodiment 5 encrypts the data to be distributed using the extended sequence number 50 and the time stamp 51 with the structure of FIG. 4, as previously mentioned. As an alternative, with the structure of FIG. 3 of above-mentioned embodiment 3, the distribution server in accordance with this embodiment 5 can replace the extended sequence number 50 with a combination of the sequence number 47 and the time stamp 51, and can set the result of the encryption of the logical exclusive OR operation on the initial vector 48 and the combination of the sequence number 47 and the time stamp 51 as the cipher block 49.

In addition, instead of using the extended sequence number 50 and the time stamp 51, the distribution server in accordance with this embodiment 5 encrypts the data to be distributed using the sequence number 47 and the time stamp 51.

Although the distribution server in accordance with this embodiment 5 encrypts the sequence number 50 and the time stamp 51, as previously mentioned, the distribution server does not necessarily encrypt them, as in the case of above-mentioned embodiment 1.

Many widely different embodiments of the present invention may be constructed without departing from the spirit and scope of the present invention. It should be understood that the present invention is not limited to the specific embodiments described in the specification, except as defined in the appended claims.

What is claimed is:

1. A data distribution apparatus comprising:
   a packet generating unit including a processor for packetizing data into a plurality of packets, and for adding identification information to a header of each of the plurality of packets, the identification information identifying each of the plurality of packets;
   an encryption key sharing unit for sharing an encryption key with a data receiver;
   a packet encrypting unit for dividing data included in each of the plurality of packets generated by said packet generating unit into blocks, and for encrypting the data included in each of the plurality of packets on a block-by-block basis using the encryption key which said encryption key sharing unit shares with said data receiver in such a manner that, when encrypting a first block of the data, said packet encrypting unit encrypts it using the identification information for identifying each of the packets, which is contained, as an initial vector, in the header of each of the plurality of packets, and, when encrypting each subsequent block of the data, encrypts it according to an encryption method which uses an immediately-previously-encrypted block, wherein said packet encrypting unit uses, as said initial vector, an extended sequence number which is a combination of a counter's value indicating the number of times which the sequence number contained in header of each of the plurality of packets exceeds an upper limit of the sequence number and is then cycled, and said sequence number; and a packet communications unit for distributing each of the plurality of packets encrypted by said packet encrypting unit to said data receiver via a communications path.

2. The data distribution apparatus according to claim 1, wherein said packet encrypting unit uses a CBC (Cipher Block Chaining) mode as the encryption method.

3. The data distribution apparatus according to claim 1, wherein said packet generating unit packetizes the data into a plurality of IP (Internet Protocol) packets, and said packet encrypting unit uses an ID (identifier) contained in an IP header of each of the plurality of IP packets as said initial vector.

4. The data distribution apparatus according to claim 1, wherein said packet generating unit packetizes the data into a plurality of UDP (User Datagram Protocol) packets, and said packet encrypting unit uses an ID (identifier) contained in a UDP header of each of the plurality of UDP packets as said initial vector.

5. The data distribution apparatus according to claim 1, wherein said packet generating unit packetizes the data into a plurality of RTP (Realtime Transport Protocol) packets, and said packet encrypting unit uses a sequence number contained in an RTP header of each of the plurality of RTP packets as said initial vector.

6. The data distribution apparatus according to claim 5, wherein said packet encrypting unit encrypts said sequence number according to said encryption method which uses a predetermined initial vector which said data distribution apparatus shares with said data receiver, and using said encryption key, and uses, as said initial vector, said sequence number which is encrypted.

7. The data distribution apparatus according to claim 1, wherein said packet encrypting unit encrypts said extended sequence number according to said encryption method which uses a predetermined initial vector which said data distribution apparatus shares with said data receiver, and using said encryption key, and uses, as said initial vector, said extended sequence number which is encrypted.

8. The data distribution apparatus according to claim 1, wherein said packet encrypting unit uses a value which is set on a random basis as an initial value of said counter, and shares the value with said data receiver.

9. The data distribution apparatus according to claim 7, wherein said packet encrypting unit uses a value which is set on a random basis as an initial value of said counter, and shares the value with said data receiver.

10. The data distribution apparatus according to claim 1, wherein said packet encrypting unit uses, as said initial vector, said extended sequence number and a time stamp included in the RTP header and showing time information.

11. The data distribution apparatus according to claim 10, wherein said packet encrypting unit encrypts said extended sequence number and said time stamp according to said encryption method which uses a predetermined initial vector which said data distribution apparatus shares with said data receiver, and using said encryption key, and uses, as said initial vector, said extended sequence number and said time stamp which are encrypted.

12. A data communications system including a data distribution apparatus which distributes data, and a data receiver which receives the data distributed thereto from said data distribution apparatus, said data distribution apparatus comprising: a packet generating unit including a processor for packetizing data into a plurality of packets, and for adding identification information to a header of each of the plurality of packets, the identification information identifying each of the plurality of packets; a first encryption key sharing unit for sharing an encryption key with said data receiver; a packet encrypting unit for dividing data included in each of the plurality of packets generated by said packet generating unit into blocks, and for encrypting the data included in each of the packets on a block-by-block basis using the encryption key which said first encryption key sharing unit shares with said data receiver in such a manner that, when encrypting a first block of the data, said packet encrypting unit encrypts it using the identification information for identifying each of the plurality of packets, which is contained, as an initial vector, in the header of each of the plurality of packets, and, when encrypting each subsequent block of the data, encrypts it according to an encryption method which uses an immediately-previously-encrypted block wherein said packet encrypting unit uses, as said initial vector, an extended sequence number which is a combination of a counter's value indicating the number of times which the sequence number contained in header of each of the plurality of packets exceeds an upper limit of the sequence number and is then cycled, and said sequence number; and a first packet communications unit for distributing each of the plurality of packets encrypted by said packet encrypting unit to said data receiver via a communications path, and said data receiver comprising: a second packet communications unit for receiving each of the plurality of packets distributed by said first packet communications unit of said data distribution apparatus; a second encryption key sharing unit for sharing the encryption key with said data distribution apparatus; a packet decrypting unit for decrypting each of the plurality of packets received by said second packet communications unit using the encryption key which said second encryption key sharing unit shares with said data distribution apparatus; and a data reproducing unit for reproducing the data from the plurality of packets decrypted by said packet decrypting unit.

* * * * *